Figure 1:
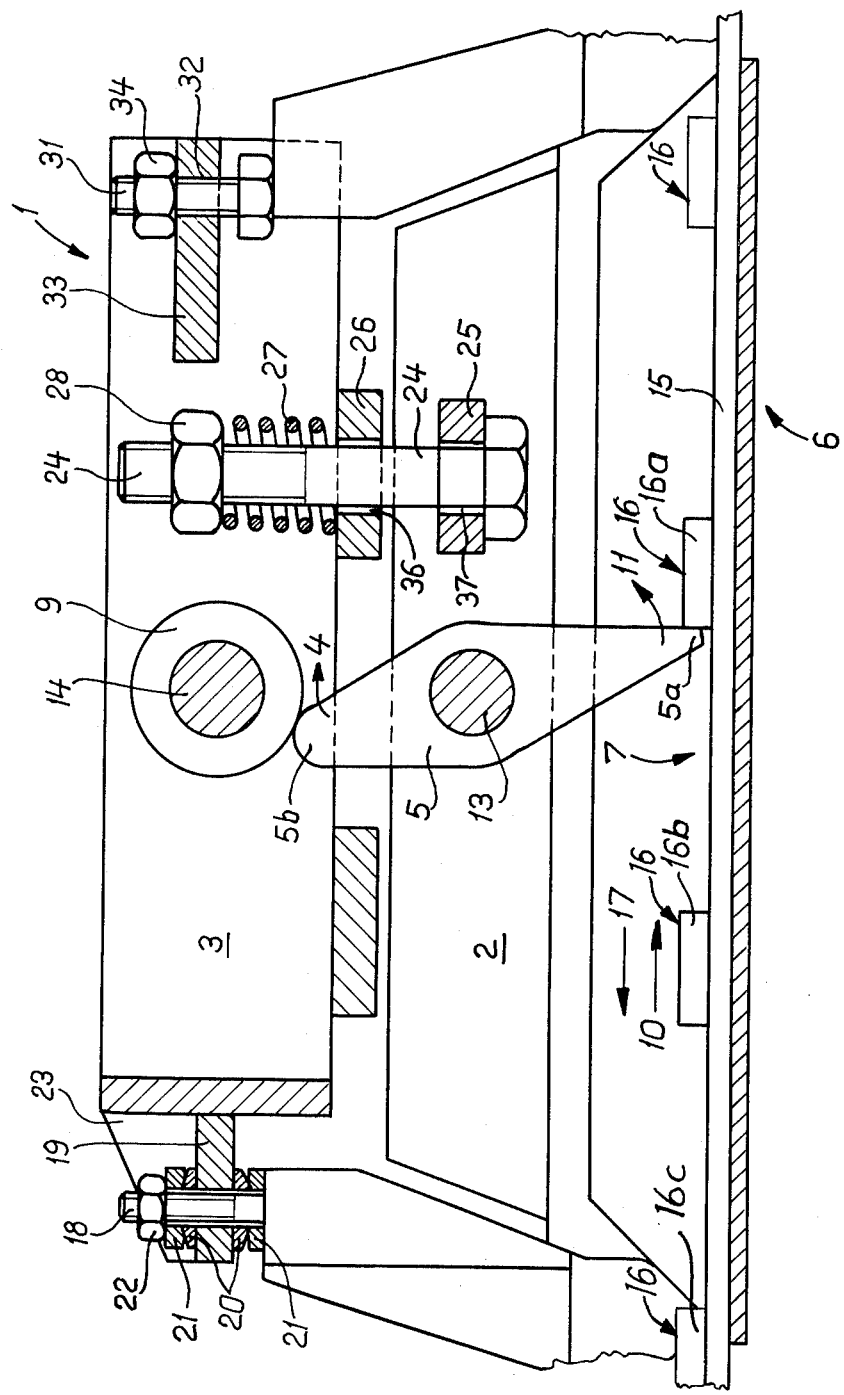

United States Patent [19]

Gallei

[11] 4,079,832

[45] Mar. 21, 1978

[54] MANURE REMOVER

[75] Inventor: Herbert Gallei, Woellersdorf, Austria

[73] Assignee: Alfa-Laval AB, Tumba, Sweden

[21] Appl. No.: 728,125

[22] Filed: Sep. 30, 1976

[51] Int. Cl.² .................................. B65G 25/04
[52] U.S. Cl. .................................. 198/719; 198/745; 198/747
[58] Field of Search ............... 198/718, 719, 736, 738, 198/741–748

[56] References Cited

U.S. PATENT DOCUMENTS 3,306,435  2/1967  Wenger .................. 198/746
3,799,330  3/1974  Floter .................... 198/747

Primary Examiner—Johnny D. Cherry
Assistant Examiner—Joseph E. Valenza
Attorney, Agent, or Firm—Cyrus S. Hapgood

[57] ABSTRACT

A reciprocating drive unit is operable through a clutch assembly to move a manure scraper step-wise first in one direction and then in the opposite direction along a manure track. The clutch assembly includes means responsive to an overload on the scraper for causing the clutch assembly to self-activate the reversal of travel of the scraper, and means for adjusting said responsive means to vary the amount of overload required to effect said reversal.

3 Claims, 3 Drawing Figures

MANURE REMOVER

The present invention relates to a manure remover comprising a bidirectional drive unit, a scraper movable over a manure collecting track, and a clutch assembly enabling the drive unit to activate the scraper stepwise, first in one direction and, after reversal, in the opposite direction.

In this well-known manure remover, the scraper is activated through an oscillating driveshaft until it reaches the end of the manure track. At that point, sensing prongs contact the reversing mechanism. Thus, the drive unit reverses the direction of the scraper travel until the opposite end of the manure track is reached. These well-known manure removers have the disadvantage that in case of overload of the scraper or of the drive unit between the top stops, parts of the manure remover or its drive unit may be damaged as it reaches the end of the track. Also, sick animals remaining on the track can be seriously injured.

An object of this invention is to eliminate the disadvantages of the above-described manure remover in a highly effective manner and to create a manure remover of high reliability and low production cost.

The invention achieves its object by providing means responsive to a preselected overload on the scraper for causing the clutch assembly to reverse the direction of scraper travel automatically, and means for adjusting said responsive means to vary the amount of overload required to effect said reversal.

The invention incorporates a particularly advantageous design in which the clutch assembly includes two adjacent movable parts which move against each other balanced by a spring. One of the movable parts carries a rotatable lever having one end positioned in the path of the drive unit. This drive unit carries the lever in the familiar manner with it. The other end of the same lever rests against a stop, preferably in the form of a drum or an axle.

Figure 3:
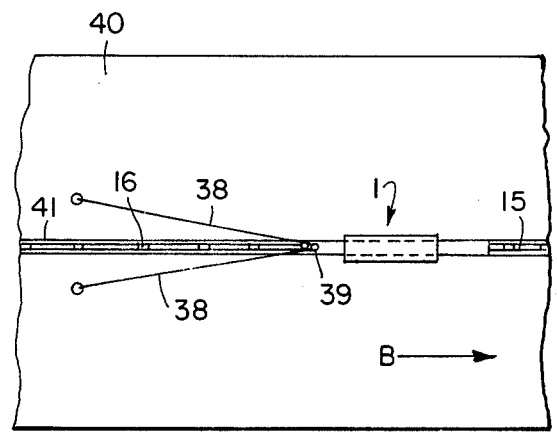
Figure 2:
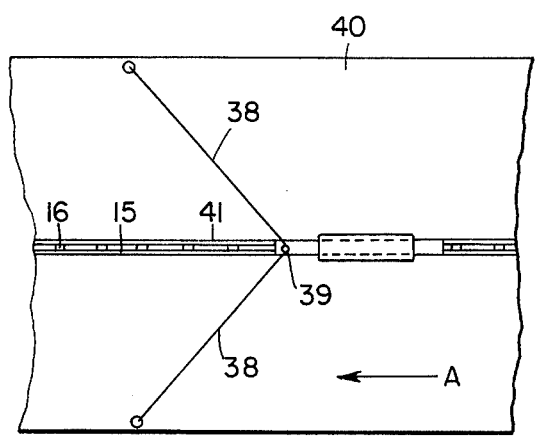

Further advantages and details of the invention will be described with reference to the accompanying drawings where FIG. 1 is a sideview of an example of the new clutch assembly for a manure scraper, some parts being in cross-section, FIGS. 2 and 3 are schematic plan views of the clutch assembly with the scraper in its advancing or scraping position, and in its returning position, respectively.

The clutch assembly 1 in its entirety includes a lower part 2 and an upper part 3. The lower and upper parts 2 and 3 are joined to each other by a pivoting joint comprising two bearing parts 20 resting on a bearing support (cup) 21. A plate 19 extending from the upper part 3 is reinforced with a support plate 23. The bearings 20 are positioned on both sides of the plate 19 of the upper part 3. The bearings 20, the plate 19, and bearing support 21 have openings which align with each other and through which a bolt 18 is inserted, this bolt being fastened to the lower part 2. A threaded nut 22 fastened to bolt 18 presses against the bearing supports 21, the bearings 20, and the flange plate 19. In order to provide a pivoting motion of the upper part 3 with respect to the lower part 2, the bolt 18 has a smaller diameter than the corresponding openings in the bearings 20, the plate 19 and the bearing supports 21. The clutch assembly is located above a conventional pushrod 15 which is a part of the entire drive element 6 and is equipped with a plurality of carriers 16 uniformly distributed along the pushrod 15. The pushrod 15 is moved back and forth. A threaded bolt 31 is connected to the lower part 2 on the right side of the clutch assembly and is inserted through opening 32 and fastened to plate 33 which protrudes from the upper part 3. By adjustment of nut 34, the extent of the pivoting motion can be predetermined in the pivoting joint 20, 21 with respect to the lower part. The lower and upper parts 2 and 3 are provided with protruding plates 25 and 26 whose openings 36, 37 align with each other. Through these openings a bolt 24 is inserted. Between the plate 26 and the nut 28 of the bolt, a spring 27 is located whose compression can be preset through tightening of the nut 28.

The clutch assembly acts to carry the scraper connected to it in one direction of travel of the pushrod 15, while in the other direction the pushrod 15 is decoupled via the clutch assembly. For this purpose, a lever 5 is attached to an axle 13 of the lower part 2 (via a bearing to allow rotational motion) and rests against the carrier 16 in its path 7.

It can be recognized that by moving the pushrod 15 to the left in the direction of the arrow 17, the lower end 5a of the lever 5 is carried by the carrier 16a, while the upper end 5b of the lever 5 presses against the outside of roller 9. This roller is positioned on shaft 14 which is part of the upper part 3. The roller 9 serves as a backstop so that upon continued motion of the pushrod 15 in the direction of the arrow 17, the entire clutch assembly 1 and the scraper connected to it are carried along. Upon reversing the direction of the pushrod 15 so that it moves in the direction of the arrow 10, the carrier 16a disengages from the end 5a of the lever 5, and the adjacent carrier 16b turns the lever 5 in the direction of the arrow 11 and slides beneath the end 5a. Thus, the carrier 16b is eventually located to the right of end 5a of the lever 5. Consequently, with the next forward motion of the pushrod 15 (to the left), the lever 5 will be engaged by carrier 16b and rotated in the direction of arrow 4, coming to rest against the roller 9, and thus the clutch assembly 1 with the attached scraper will be moved again to the left. When pushrod 15 again moves to the right, the next carrier 16c slides beneath the lever end 5a so that this carrier, upon the next reversal of the pushrod movement, acts through lever 5 to move the clutch assembly another step to the left. Under normal conditions, this action is repeated until the clutch assembly 1 reaches the left-hand end of the manure track, it being understood that carriers 16 are uniformly distributed along pushrod 15 over a length thereof which is sufficient to move the clutch assembly from end to end of the manure track as the pushrod reciprocates.

Assume that the clutch assembly 1 with the scraper, while being moved to the left as described above, is subjected to an overload, as when the scraper contacts a stop at the lefthand end of the manure track or contacts a sick animal lying on the manure track. The roller 9 and with it the upper part 3 will then be lifted from lever 5 while in the forward direction of motion (to the left), and thus the end 5b of the lever 5 moves to the right side of roller 9. In this new position of lever 5, the roller 9 serves as a backstop in the reverse direction. Thus, continued reciprocation of rod 15 will now move the clutch assembly and its attached scraper stepwise to the right in the direction of arrow 10 until they are again subjected to an overload, whereupon roller 9 and the upper part 3 will again be lifted from lever 5 so that its end 5b returns to the left side of roller 9.

By tightening of the nut 28, the compression of the spring 27 can be adjusted, thereby preselecting the desired force at which the overload protection is engaged.

It will be apparent from the foregoing that, under normal conditions, reciprocation of pushrod 15 causes the clutch assembly 1 and scraper to move stepwise back and forth from one end of the manure track to the other, the reversal of their direction of movement being effected automatically when they contact one of the stops at the opposite ends of the track. Thus, no special device is needed to cause this reversal; and the same mechanism of the clutch assembly which provides overload protection (to prevent injury to animals, for example) also functions to effect reversal of the movement at each end of the track.

By way of example, the length of each stroke of pushrod 15 may be 2 meters, and the spacing between adjacent carriers 16 on the pushrod may be 20 centimeters less than 2 meters.

The clutch assembly of the present invention may be applied to the manure scraper in the same manner as the clutch assembly in U.S. Pat. No. 3,799,330 granted Mar. 26, 1974.

Thus, as shown in FIGS. 2 and 3, the clutch assembly 1 may be connected to a scraper in the form of turnable scraper wings 38 which are journalled on a pivot 39 on the clutch assembly 1. The scraper wings 38 move stepwise along the manure track 40 in an operating or scraping direction, as shown by arrow A in FIG. 2, and in a return or non-scraping direction as shown by arrow B in FIG. 3. The manure track 40 has a central longitudinal groove 41 in which the pushrod 15 and the clutch assembly 1 moves.

I claim:

1. A manure remover comprising the combination of a bidirectional drive unit, a scraper movable over a manure track in either direction, and a clutch assembly operating in either direction of the drive unit and through which the scraper is carried step-wise first in one direction and then in the reverse direction, the clutch assembly including means responsive to an overload on the scraper for causing the clutch assembly to self-activate the reversal of travel of the scraper, and means for adjusting said responsive means to vary the amount of overload required to effect said reversal, said responsive means including two adjacent parts movable relative to each other, a spring opposing relative movement of said parts in one direction, a lever mounted on one of said parts for rotation about an axis, one end of the lever being located in the path of the drive unit so as to be carried thereby, and a backstop mounted on the other of said parts and against which the other end of said lever rests.

2. The combination of claim 1, in which said two parts are located one above the other and are pivotally interconnected at one side, said adjusting means being a member operable to vary the force with which said spring opposes said relative movement in one direction.

3. The combination of claim 1, in which the clutch assembly also includes means for adjusting the range of said relative movement of said two parts.

* * * * *